United States Patent
Williams

(10) Patent No.: US 11,086,022 B2
(45) Date of Patent: Aug. 10, 2021

(54) METHOD AND APPARATUS FOR TESTING CODE DIVISION MULTIPLE ACCESS RECEIVERS

(71) Applicant: THE SECRETARY OF STATE FOR DEFENCE, Salisbury (GB)

(72) Inventor: Stephen Williams, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 0 days.

(21) Appl. No.: 16/966,519

(22) PCT Filed: Feb. 20, 2019

(86) PCT No.: PCT/GB2019/000030
§ 371 (c)(1),
(2) Date: Jul. 31, 2020

(87) PCT Pub. No.: WO2019/166751
PCT Pub. Date: Sep. 6, 2019

(65) Prior Publication Data
US 2021/0041573 A1     Feb. 11, 2021

(30) Foreign Application Priority Data
Feb. 27, 2018 (GB) ..................................... 1803150

(51) Int. Cl.
*G01S 19/23* (2010.01)
(52) U.S. Cl.
CPC .................... *G01S 19/23* (2013.01)
(58) Field of Classification Search
CPC ................. G01S 19/23; G01R 31/318371
See application file for complete search history.

(56) References Cited

U.S. PATENT DOCUMENTS

| 2005/0144547 A1 | 6/2005 | Li |
| 2010/0127918 A1 | 5/2010 | Vadlamani et al. |
| 2011/0050489 A1 | 3/2011 | Maenpa et al. |

(Continued)

FOREIGN PATENT DOCUMENTS

WO      2016207658 A1      12/2016

OTHER PUBLICATIONS

International Patent Application No. PCT/GB2019/000030, International Preliminary Report on Patentability dated Sep. 3, 2020, 11 pages.

(Continued)

*Primary Examiner* — Dao L Phan
(74) *Attorney, Agent, or Firm* — Dean W. Russell; William Sparkman; Kilpatrick Townsend & Stockton LLP

(57) ABSTRACT

A method for testing a receiver in a code division multiple access (CDMA) communications system. Frequency spectrums for each of a plurality of provided CDMA code patterns (31) are generated (35) and phase shifted (36), before being combined (37) to generate a constellation spectrum. The constellation spectrum is converted 38 to a time domain constellation signal which can be injected (33) into a CDMA receiver under test. The method allows for fast and cost-effective synthetic generation of constellation signals that are particularly suited to testing global navigation satellite system (GNSS) receivers. Also relates to apparatus for providing the same.

11 Claims, 5 Drawing Sheets

(56) References Cited

U.S. PATENT DOCUMENTS

| | | | |
|---|---|---|---|
| 2011/0163762 A1* | 7/2011 | Marchetti | G01R 31/2822 |
| | | | 324/615 |
| 2011/0241939 A1 | 10/2011 | Maenpa et al. | |
| 2013/0099967 A1 | 4/2013 | Ramasubramanian et al. | |
| 2014/0119421 A1* | 5/2014 | El-Hassan | H04B 17/29 |
| | | | 375/227 |
| 2016/0047916 A1 | 2/2016 | Pearse et al. | |

OTHER PUBLICATIONS

United Kingdom Patent Application No. GB1803150.0, Search Report dated Aug. 28, 2018, 3 pages.
International Patent Application No. PCT/GB2019/000030, International Search Report and Written Opinion dated May 28, 2019, 15 pages.
United Kingdom Patent Application No. GB1902494.2, Search Report dated Aug. 15, 2019, 4 pages.

* cited by examiner

METHOD AND APPARATUS FOR TESTING CODE DIVISION MULTIPLE ACCESS RECEIVERS

TECHNICAL FIELD OF THE INVENTION

This invention relates to the field of code division multiple access (CDMA) receiver testing, in particular to the testing of global navigation satellite system (GNSS) receivers.

BACKGROUND TO THE INVENTION

Code division multiple access (CDMA) is a channel access technique used in signal transmission and receipt. The technique allows a plurality of users to send or receive information on the same individual, or band of, carrier frequencies. As such CDMA is particularly useful in applications where there exists either a large number of transmitters, a large number of receivers, or both, and the relative bandwidth available for transmission is low. As such, CDMA is useful in high user applications such as mobile telephony, wireless networks, and global navigation satellite systems (GNSS).

Each user in a CDMA system is assigned a different code pattern to modulate and demodulate their respective transmitted or received signals. Ideally each code pattern is chosen to be orthogonal from other users of the CDMA system. Thus a CDMA receiver generally operates in an environment where at any given time it is receiving a plurality of CDMA signals simultaneously, the combination of which may be referred to as a constellation signal. The CDMA code patterns ensure that when a constellation signal is received by a user, a correlation of that signal with a particular code pattern, only returns a high correlation score for parts of the constellation signal that have been modulated with the same code pattern. Therefore the parts of a signal relevant to that particular user (or the parts of a constellation originating from a particular transmitter) can be identified and interrogated for information contained therein.

CDMA systems may use ground based transmitters, or aerial transmitters such as satellites, or a combination thereof. A known application of CDMA is in global navigation satellite systems (GNSS). GNSS uses satellites (CDMA transmitters) to provide geo-spatial positioning information to a user of a GNSS receiver (a CDMA receiver). The global positioning system (GPS) is a further example of such as system. The GPS employs a set of orthogonal code patterns referred to as coarse acquisition codes or 'Gold Codes'. Each satellite in the GPS system is assigned one of the gold codes, with all satellites transmitting separate signals using their respective gold codes but on the same carrier frequency. Therefore a GPS receiver will receive upon a single carrier frequency, a constellation signal comprising many individual transmissions from the various GPS satellites. The GPS receiver must interpret this constellation signal in order to function and provide accurate positioning information to a user of that receiver. To this end, a GPS receiver typically comprises multiple correlators, each correlator using a respective gold code to extract from a constellation signal the information coming from one particular satellite. In particular, satellite orbital parameters such as time, location, speed, direction, of each satellite, are broadcast using the satellite's respective gold code. Being able to associate received signals with particular satellites allows a GPS receiver to determine its own position (by for instance determining the time of flight for each signal from each respective satellite). Typically a GPS receiver may be receiving a constellation signal comprising ranging information from up to 12 different satellites. A GPS receiver may therefore comprise 12 different correlators, each performing a correlation of the received signal using a different one of the 12 gold codes.

The performance of a receiver in a CDMA system in interpreting received signals modulated with code patterns, such as the gold codes of the GPS system, is a critical factor in the receiver being deemed fit for purpose. Assessing the performance of a CDMA receiver in the 'real-World' is difficult to achieve in a predictable and deterministic manner. For instance weather conditions may make successive GNSS receiver tests non-repeatable. The desire to test the performance of CDMA receivers has therefore resulted in test equipment being developed to synthetically generate and inject constellation signals into a given CDMA receiver in a more repeatable manner. Typically however the signals are still injected as free-space radio frequency signals via the CDMA receiver's antenna. A test setup of this type may comprise multiple separate signal generators, each generating an individual signal using a specific CDMA code pattern. The signals are then either simultaneously radiated towards the CDMA receiver, or combined and radiated as a single constellation signal. A test setup of this type is generally prohibitively expensive for many potential users of CDMA test equipment.

An alternative and potentially lower cost option is to digitally model the time based representations of the waveforms, and their combinations, and then download the resultant waveform to an arbitrary waveform signal generator for playback to the CDMA receiver. However modelling the waveforms and combining them in the time domain can be computationally intensive, in particular when combining waveforms with various time delays, as would be typical for GNSS constellation signals.

Therefore it is an aim of the present invention to provide an alternative method and apparatus for testing CDMA receivers.

SUMMARY OF THE INVENTION

According to a first aspect of the invention there is provided a method of testing a code division multiple access (CDMA) communications system receiver, the method comprising the steps of providing at least one receiver and a plurality of CDMA code patterns; generating a constellation signal from the plurality of code patterns; injecting the constellation signal into the receiver at a predetermined carrier frequency; and determining the response of the receiver, thereby testing the receiver; wherein the step of generating a constellation signal comprises the additional steps of computing a precomputed frequency spectrum from each of the code patterns in the plurality of CDMA code patterns, each precomputed frequency spectrum comprising a plurality of frequency bins; applying a predetermined phase shift to each of the frequency bins in each of the plurality of precomputed frequency spectrums, thereby generating a plurality of modified frequency spectrums; performing a vector sum of the modified frequency spectrums to generate a constellation frequency spectrum; and applying an inverse Fourier transform to the constellation frequency spectrum to generate a constellation signal.

A CDMA communications system receiver is a device that receives and demodulates a signal in a CDMA system. By demodulating the signal, useful information about the CDMA system can be determined (such as geo-position of transmitters and relative position of the CDMA receiver itself). A CDMA communications system receiver may therefore comprise one or more correlators for correlating a received signal (which may be that emitted by a single CDMA transmitter or may be a combination of such signals in the form of a constellation signal) with respective code pattern/s. By virtue of being able to identify if a signal, or part of a signal, has originated from a particular transmitter, information embedded in that signal/part of signal can then be associated with that particular transmitter. The CDMA receiver may be 'tested' in respect of its ability to correlate a received signal with a code pattern, or a received signal with many code patterns, and derive therefrom information such as parameters associated with the transmitter/s, or parameters associated with the CDMA receiver itself (deriving its own geo-position in the case of a GNSS system for instance).

A constellation signal is intended to mean a combination of the signals emitted by CDMA transmitters in a CDMA system. Each CDMA transmitter will emit a signal modulated with its respective code pattern. Multiple transmitters operating simultaneously at the same carrier frequency may result in a CDMA receiver receiving a simultaneous combination of the aforesaid signals. However a constellation signal may also be considered as a combination of separate CDMA transmitter signals, but where only one signal has a non-zero amplitude. Such a scenario may be realised where only a radiated signal from one transmitter is received. A CDMA receiver must still be able to process such a signal, and therefore a requirement for testing a signal of this type also exists. The nature of the constellation signal may be electrical (for instance as transmitted along a wire) or may be electromagnetic (as radiated through free space via an antenna).

The constellation signal is injected into the CDMA receiver, such that the receiver can be tested. The method of injection may be direct signal injection i.e. the constellation signal is an electrical signal that is input to the receiver electrically. Alternatively the constellation signal may be injected as modulated electromagnetic radiation through use of an antenna radiating towards another antenna on the CDMA receiver.

The predetermined carrier frequency is the frequency at which the CDMA receiver operates at the point of injection. For instance, an antenna of a CDMA receiver may operate at a particular frequency and therefore the predetermined carrier frequency will be the same frequency if the injection is via the antenna. However, where the constellation signal is injected electrically, then the frequency of operation at the point of injection may be different to the antenna frequency (as it is typical to mix the frequency of an antenna system to a lower frequency further along the receive chain from the antenna for processing purposes).

The response of the receiver may be a correlation score across one or more correlators in the CDMA receiver. Alternatively the response may be the CDMA receiver correctly extracting particular information communicated via the constellation signal, from the constellation signal. By way of example if the CDMA receiver is a GPS receiver, then the response may be the extraction of a particular satellite's orbital information. Alternatively the response may be the correct determination of the GPS receiver's position. The response may be determined by monitoring signals within the CDMA receiver directly via instrumentation wires attached to the electronic circuitry of the CDMA receiver, or may be determined by viewing any displays on the CDMA receiver itself (for instance the display of a GPS receiver showing its geo-position).

Specifically the method of testing a CDMA receiver requires precomputed frequency spectrums. The precomputed frequency spectrums are Fourier transforms of the code patterns used by the CDMA system under test. The method of the invention takes advantage of the fact that the code patterns of a CDMA system are known. Therefore the precomputed frequency spectrums can be generated prior to testing the CDMA receiver and thus be readily available for use as required. The precomputed frequency spectrums may be stored in internal memory in a computer system, for instance.

The precomputed frequency spectrums each comprise a plurality of frequency bins. The frequency bins are preferably equally spaced (in frequency) and may be determined by the duration of the code pattern. Each frequency bin represents the amplitude and phase of each respective frequency component.

A predetermined phase shift is added to each frequency bin in each precomputed frequency spectrum. The phase shifts represent the propagation delay in a given signal reaching the CDMA receiver after its emission from the respective CDMA transmitter. Therefore each code pattern may have a different set of phase shifts applied to its respective precomputed frequency spectrum (for instance different satellites may be at different ranges to a receiver, and therefore have different propagation delays). Furthermore, each frequency bin will have a different predetermined phase shift owing to the different frequency being represented. The person skilled in the art would be familiar with calculating phase shifts from propagation delays. By adding the predetermined phase shifts to each precomputed frequency spectrum, respective modified frequency spectrums are generated. Therefore for each code pattern of the CDMA system, a modified frequency spectrum is generated. The phase shifts are 'predetermined' in the sense that they are known prior to performing the testing of the CDMA receiver. For instance a user of the method may, immediately before testing the CDMA receiver, select phase shifts to be applied. Alternatively the user may have a matrix of phase shifts ready to be applied and already stored in a computer system before the testing of the CDMA receiver. In general the test scenario being presented to the CDMA receiver is known prior to performing the test itself.

A particular advantage of the invention is that because frequency spectra are commutative, signals may be combined by a vector sum of each frequency bin across the plurality of modified frequency spectrums, thereby generating a constellation frequency spectrum efficiently. By applying an Inverse Fourier Transform to the constellation frequency spectrum a constellation signal is generated in the time domain, representing the combination of signals emitted by transmitters in the CDMA system. The single constellation signal can then be up-converted to the desired predetermined carrier frequency and injected into the CDMA receiver under test. The method of the invention therefore provides an efficient alternative to CDMA receiver testing methods that operate purely in the time domain.

In some embodiments of the invention the steps of generating the constellation signal, injecting the constellation signal, and determining the response of the receiver, are repeated across a plurality of time steps. The method of the invention is therefore applicable to static test scenarios and dynamic test scenarios. The former scenario being, by way of example, where the CDMA transmitters in a CDMA system are all at fixed ranges from a CDMA receiver and are thus non-moving. However in dynamic scenarios, the constellation signal will need to be regenerated at each increment in time throughout the test. This is because the CDMA transmitters in a dynamic environment are moving (and thereby the range to the CDMA receiver under test would be changing, as would any orbital parameters for instance if the CDMA transmitter is a satellite).

In preferred embodiments of the invention the precomputed frequency spectrums are computed by performing a Fast Fourier Transform of each code pattern used by the CDMA system. A Fast Fourier Transform operates on a time limited sample of a signal. The time limited sample is generally discontinuous at the boundary of the sample, and therefore a windowing function is often applied to the sample to mitigate the effect of the discontinuities. A Fast Fourier Transform then processes the 'window' as if it were infinitely repeated—but in order to achieve this, two or more separate processing streams that are overlapped in time are required. The method of the invention takes advantage of the repetitive nature of the code patterns of a CDMA system. A CDMA receiver will require regular updates of the same type of information from a CDMA transmitter, and therefore the repeating nature of the code patterns means the time limited sample upon which a Fast Fourier Transform operates, can be aligned to the code pattern itself. This mitigates the requirement to have a windowing function applied to the time limited sample, and therefore mitigates the requirement to have multiple processing streams overlapping (in time).

In preferred embodiments of the invention the CDMA system is a global navigation satellite system (GNSS), and the CDMA receiver is a GNSS receiver. A GNSS generally comprises a plurality of satellites each transmitting a GNSS signal using a respective code pattern, thereby allowing the multiple satellites to transmit simultaneously in the same narrow frequency band, or even on the same individual frequency. A GNSS also comprises GNSS receivers, the receivers correlating received GNSS signals (whether that be individually or in combination) with the code patterns, thereby determining which signals (or portions thereof) originate from each satellite.

In more preferred embodiments the GNSS is the global positioning system (GPS), and the GNSS receiver is a GPS receiver. The code patterns used by GPS satellites to modulate signals (and by GPS receivers to correlate with said signals) may be the GPS coarse acquisition codes, also known as 'gold codes'. The parameters of the GPS coarse acquisition codes are well defined, being 1023 bits long and having a repetition rate of 1.023 Mb/s (and therefore a 1 ms frame duration). The timing for the transmission of the start of each frame is synchronised to an isochronous timing system shared across the entire GPS system. Satellite orbital parameters and other system metadata are transmitted by the satellites of the GPS system using the coarse acquisition codes. These parameters can be used to inform a GPS receiver of the instantaneous location, speed, and direction of each satellite. Therefore a GPS receiver can further calculate its own position by determining the time of flight for the signal from each satellite a signal is being received from. In the GPS system there may be up to 12 satellites transmitting signals that are then received by a GPS receiver. A GPS receiver may be a satellite navigation receiver used domestically, for instance in a car or mobile phone, or may be a commercial navigation receiver used in aircraft or other large commercial vessel.

According to a second aspect of the invention there is provided apparatus for testing a code division multiple access (CDMA) communications system receiver, the apparatus comprising a signal injection means configured to inject a constellation signal into the receiver at a predetermined carrier frequency, and a computer system, wherein the computer system is configured to store a plurality of CDMA code patterns; compute a precomputed frequency spectrum from each code pattern in the plurality of CDMA code patterns, each precomputed frequency spectrum comprising a plurality of frequency bins; apply a predetermined phase shift to each frequency bin in each of the plurality of precomputed frequency spectrums, thereby generating a plurality of modified frequency spectrums; perform a vector sum of the modified frequency spectrums to generate a constellation frequency spectrum; and to apply an inverse Fourier transform to the constellation frequency spectrum to generate the constellation signal.

The signal injection means may be a transmitter and output antenna for radiating the constellation signal as electromagnetic radiation at a predetermined carrier frequency (for instance at the operating frequency of a CDMA receiver's antenna). The transmitter may be configured to generate a modulated electrical signal using the constellation signal and output this to the output antenna. The transmitter may be driven directly by the computer system (for instance by way of the transmitter being electrically connected to an output port on the computer system). Alternatively the signal injection means may be an electrical cable or wire attached to an output port of the computer system, and further attached to a wire-tap point or input port on the CDMA receiver. The constellation signal thus being directly injected, electrically, into the circuitry of the CDMA receiver.

The computer system may comprise on-board memory for storing the code patterns of the CDMA system and the precomputed frequency spectrums. The computer system may further comprise computer code for calculating the phase shifts to be applied to the precomputed frequency spectrums based on desired propagation delays (or ranges of the CDMA transmitters from the CDMA receiver) input or selected by a user of the testing apparatus. Alternatively a user of the apparatus may already have stored in the computer system a test matrix in the form of an array of propagation delays (or ranges) for each CDMA transmitter, from which the computer code calculates the phase shifts and generates the modified frequency spectrums therefrom. The computer code may further perform the vector sum and inverse Fourier Transform, thereby generating the constellation signal. The computer system comprises an output port which may be a digital output port, for outputting the constellation signal as an electrical signal. Embodiments of the apparatus may further include a housing containing both the computer system and transmitter/antenna as a single portable unit.

According to a third aspect of the invention there is provided a GPS receiver test kit comprising the apparatus of claim 7, wherein the CDMA code patterns are the GPS course acquisition codes.

BRIEF DESCRIPTION OF THE DRAWINGS

Embodiments of the invention will now be described by way of example only and with reference to the accompanying drawings, in which.

DETAILED DESCRIPTION

Figure 1:
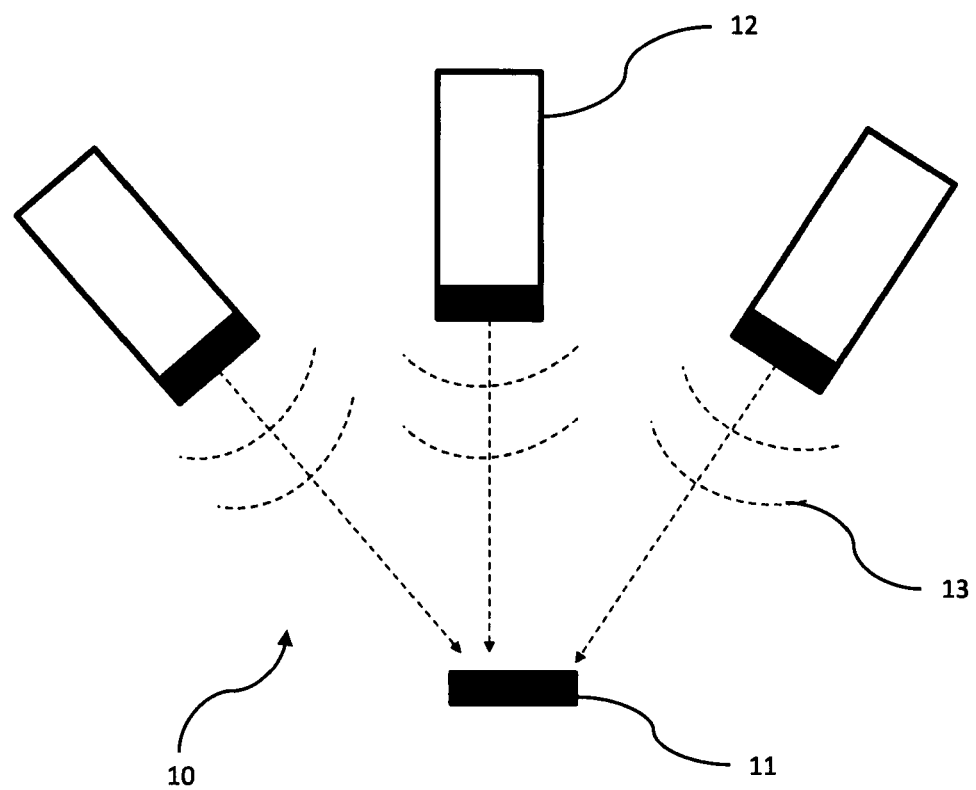
FIG. 1 shows an illustration of a Global Navigation Satellite System (GNSS)

FIG. 1 shows an illustration of a CDMA system in the form of a Global Navigation Satellite System (GNSS) 10. The GNSS 10 comprises a plurality of satellites 12 and a GNSS receiver 11. The satellites 12 are illustrated in a two dimensional view, but in reality the satellites 12 are spaced apart from each other in three dimensions. A single GNSS receiver 11 is shown, but in reality there may be many GNSS receivers in operation simultaneously. The satellites 12 emit radiation 13 at radiofrequency towards the receiver 11 as indicated by the dotted arrows in the figure. Each satellite 12 emits radiation 13 that is modulated with a respective code pattern. Embedded upon the carrier frequency of radiation 13 is information regarding each respective satellites orbital information. Therefore the receiver 11 receives, at any time, a simultaneous combination of the radiation 13 emitted by multiple satellites 12. The combination of the radiation results in a constellation signal at the receiver 11. The GNSS receiver 11 then correlates the constellation signal with the various code patterns, to identify the relevant parts of the constellation signal originating from each satellite 12. The GNSS receiver 11 then extracts each respective satellite's 12 orbital information, which includes the time of that particular radiative emission, and calculates the propagation delay (time of flight of that part of the signal from the respective satellite 12 to the receiver 11). The GNSS receiver 11 therefrom calculates its own geo-position.

Figure 2:
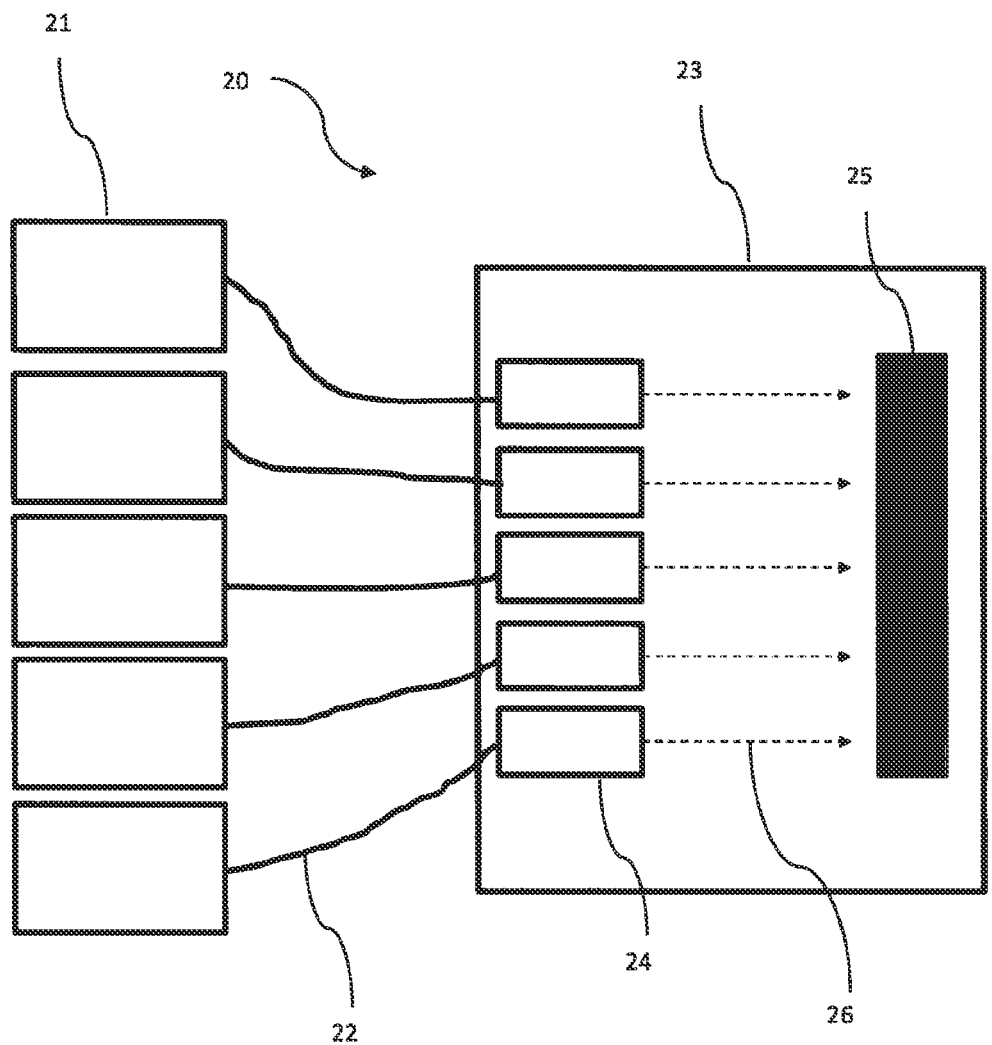
FIG. 2 shows an illustration of prior art GNSS receiver testing.

FIG. 2 shows an illustration of prior art GNSS receiver testing 20. A GNSS receiver 25 is positioned within an anechoic chamber 23 with a plurality of transmitter antennas 24. The transmitter antennas 24 are electrically connected via wires 22 to respective signal generators 21. Each signal generator 21 is programmed with a respective synthetic satellite waveform, corresponding to a respective GNSS code pattern. A phase shift representing a propagation delay is included in each respective waveform. Satellites orbital parameters are embedded in each synthetic satellite waveform. The signal generators 21 drive respective transmitter antennas 24 with the respective synthetic satellite waveforms, thereby transmitting radiation towards the receiver 25 in the direction of the dotted arrows 26. Therefore, from the perspective of the receiver 25, it apparently receives a plurality of signals from a plurality of satellites, simultaneously, on the same carrier frequency. As such a constellation signal is received at the receiver 25 which must be interpreted. The response of the receiver 25 can then be measured either my electrically monitoring particular points in the receiver circuitry, or viewing the response of the receiver directly (for instance it's position communicated to a user via a graphical user interface). GNSS receiver testing in the form 20 may be particularly expensive and require large quantities of bulky specialist equipment.

Figure 3:
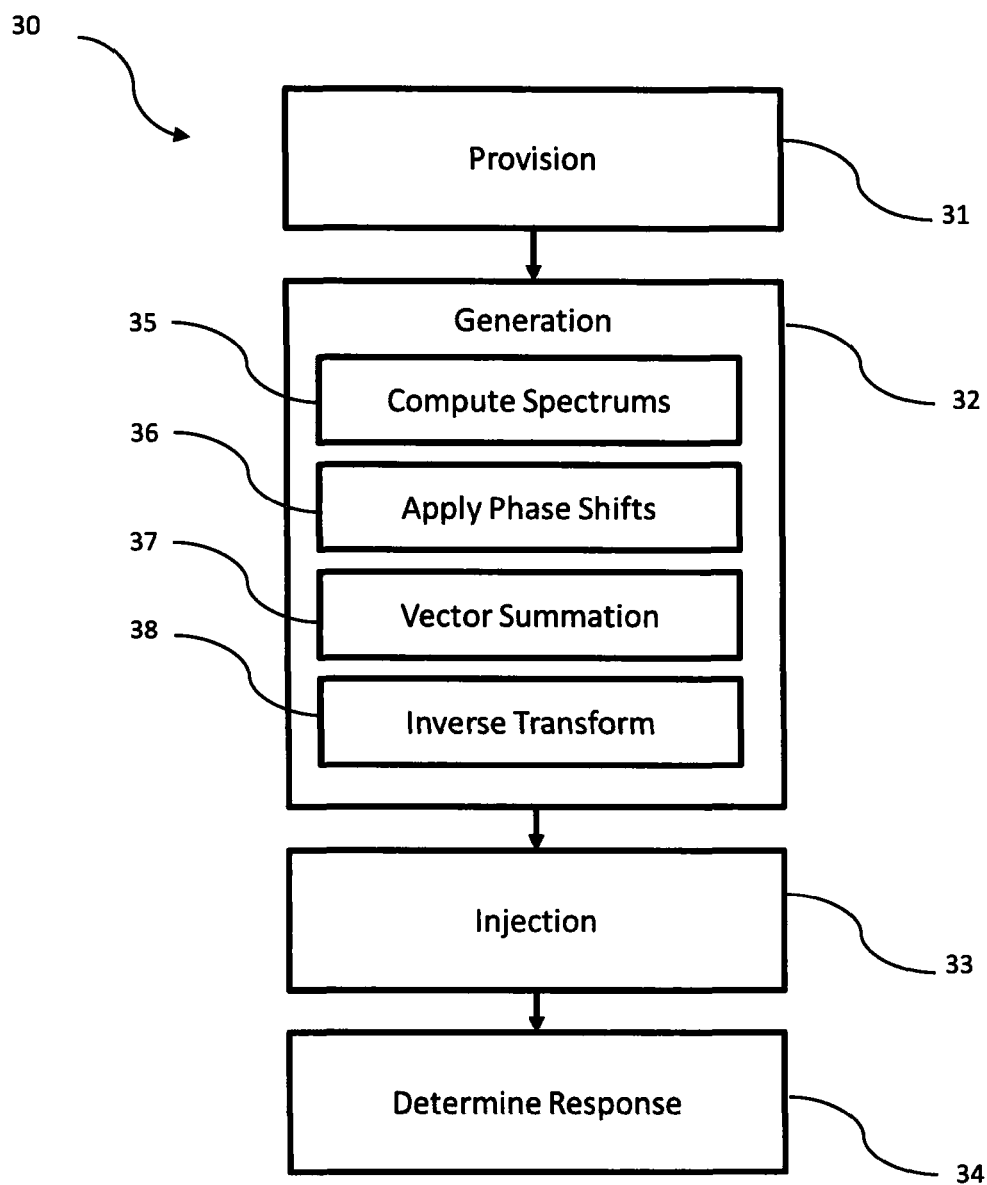
FIG. 3 shows a flow diagram of an embodiment of the first aspect of the invention.

FIG. 3 shows a flow diagram 30 of an embodiment of the method of the invention. The method comprises steps broadly referred to as provision 31, generation 32, injection 33 and determine response 34. In this particular embodiment the scenario being simulated for the purposes of testing a CDMA receiver includes three CDMA transmitters (A, B, C) initially at three different ranges (X, Y, Z) from the CDMA receiver, but where the three transmitters are moving throughout the test (i.e. a dynamic scenario). The step of provision 31 requires the CDMA receiver and the code patterns of the CDMA transmitters to be provided for testing. The CDMA receiver is provided in an operable state when tested i.e. powered and ready to receive/process CDMA signals. The step of generation 32 comprises the additional steps of computing the precomputed frequency spectrums 35. Each precomputed frequency spectrum may be a respective Fast Fourier Transform of each code pattern of the CDMA system. The Fast Fourier Transform operates on a time limited sample equal to the length of each code pattern and aligned to the start of each code pattern. The Fast Fourier Transform samples each code pattern at a predetermined sample rate. The precomputed frequency spectrums are generated prior to initiating the actual CDMA receiver tests. Following the computation of the precomputed frequency spectrums, a plurality of predetermined phase shifts 36 are applied to the precomputed frequency spectrums. The predetermined phase shifts represent the desired propagation delays associated with the simulated CDMA signals in the CDMA system scenario being tested. For instance in the scenario being tested at time zero the three CDMA transmitters (A, B, C) are at respective ranges (X, Y, Z), from a CDMA receiver under test. Therefore the code pattern associated with A requires a phase shift associated with the time of flight over distance X; the code pattern associated with B requires a phase shift associated with time of flight over distance Y; the code pattern associated with C requires a phase shift associated with the time of flight over distance Z. For static test scenarios the propagation delays are known prior to performing the actual test of the receiver, and therefore the appropriate predetermined phase shifts may be applied to each of the frequency bins in each of the precomputed frequency spectrums, prior to testing the CDMA receiver. Alternatively, for the dynamic scenario being tested, the predetermined phase shifts are recalculated at each time increment during the testing of the receiver. For the dynamic testing scenarios this particular embodiment of the method is advantageous. The precomputed frequency spectrums at the start of the test (time zero) may be stored in memory in a computer system, then as the test progresses a new set of phase shifts is readily added to the frequency bins of the precomputed frequency spectrums as the test envelops. Therefore at each time step through the test, a new set of modified frequency spectrums is generated encompassing the new phase shifts (and therefore new simulated propagation delay). A constellation frequency spectrum is then generated at each time increment through the test by vector summing 37 the frequency bins across the modified frequency spectrums at that time increment. An inverse Fourier Transform 38 of the constellation frequency spectrum is then performed to generate the time based constellation signal for that particular time increment, which may then be injected 33 to the receiver under test. In this particular scenario the CDMA system is the GPS system and each of the code patterns for transmitters A, B and C, are coarse acquisition codes. At each time increment the coarse acquisition codes are used to embed transmitter orbital information. Therefore the receiver under test is at each time increment presented with a constellation signal containing orbital information embedded in modulations using three coarse acquisition codes. The receiver under test therefore is monitoring to determine if it correctly responds to the constellation signal by calculating it's correct geo-position based on the changing embedded orbital information.

Figure 4:
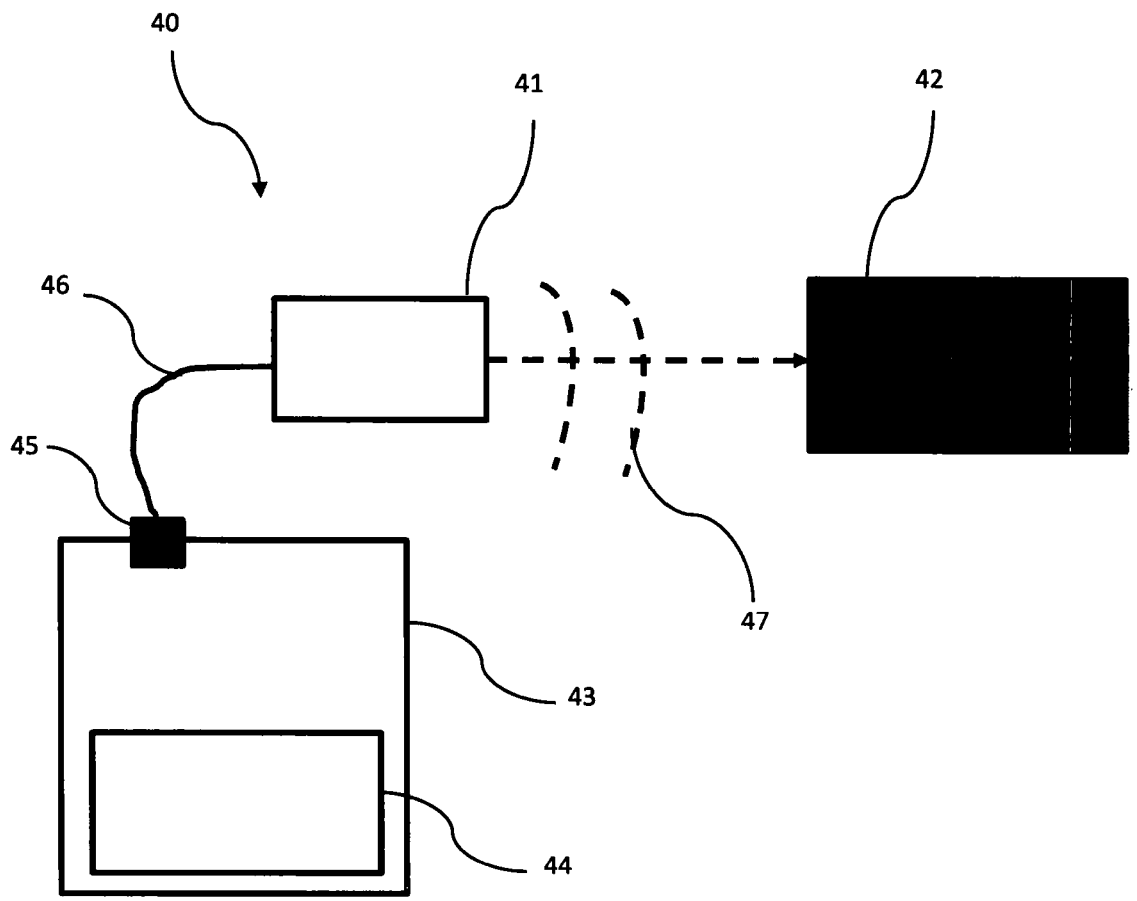
FIG. 4 shows an illustration of an embodiment of the second aspect of the invention.

FIG. 4 shows an illustration of the apparatus of an embodiment of the second aspect of the invention 40. The apparatus comprises an injection means 41 in the form of an antenna electrically connected via wires 46 to an output port 45 of a computer 43. The injection means 41 radiates electromagnetic radiation 47 at a predetermined carrier frequency. The predetermined carrier frequency is that at which a receive antenna in CDMA receiver 42 operates. The computer 43 further comprises internal memory 44. Provided in the internal memory 44 are the code patterns of the CDMA system and computer code for computing the precomputed frequency spectrums, applying predetermined phase shifts, generating modified frequency spectrums, generated constellation frequency spectrums, and generating the constellation signal. The computer code also initiates the playback of the constellation signal via the output port 45 in order to drive the antenna 41.

Figure 5:
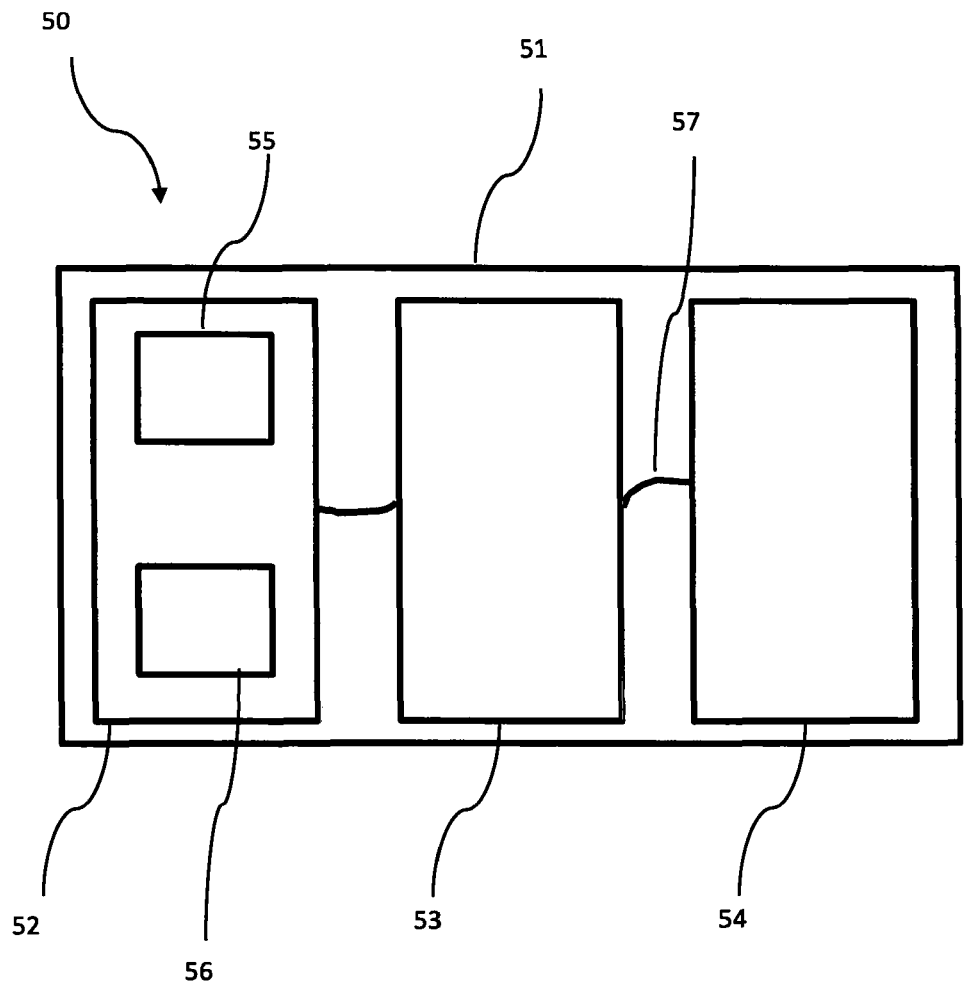
FIG. 5 shows an illustration of an embodiment of the third aspect of the invention.

FIG. 5 shows an embodiment of a GPS test kit 50 comprising a housing 51 containing a computer system 52 electrical connected to a transmitter 53 and an antenna 54. The computer system 52 further containing internal memory holding the GPS coarse acquisition codes 55 and internal memory holding computer code 56 to generate the constellation signals in accordance with the invention and control the transmission of the constellation signal via the antenna 54.

The invention claimed is:

1. A method of testing a code division multiple access (CDMA) communications system receiver, the method comprising the following steps:
    providing at least one receiver and a plurality of CDMA code patterns;
    generating a constellation signal from the plurality of code patterns;
    injecting the constellation signal into the receiver at a predetermined carrier frequency; and
    determining a response of the receiver, thereby testing the receiver;
    wherein the step of generating a constellation signal comprises the following steps:
    computing a precomputed frequency spectrum from each of the code patterns in the plurality of CDMA code patterns, each precomputed frequency spectrum comprising a plurality of frequency bins;
    applying a predetermined phase shift to each of the frequency bins in each of the plurality of precomputed frequency spectrums, thereby generating a plurality of modified frequency spectrums wherein the predetermined phase shift represents a propagation delay in a given signal reaching the CDMA receiver after its emission from the respective CDMA transmitter;
    performing a vector sum of the modified frequency spectrums to generate a constellation frequency spectrum; and
    applying an inverse Fourier transform to the constellation frequency spectrum to generate a constellation signal.

2. The method according to claim 1 wherein the steps of generating the constellation signal, injecting the constellation signal, and determining the response of the receiver, are repeated across a plurality of time steps.

3. The method according to claim 1 wherein the step of computing the plurality of precomputed frequency spectrums comprises computing a Fast Fourier Transform of each code pattern.

4. The method according to claim 1 wherein the CDMA communications system is a Global Navigation Satellite System (GNSS).

5. The method according to claim 4 wherein the GNSS is a Global Positioning System (GPS).

6. The method according to claim 5 wherein the CDMA code patterns are the GPS coarse acquisition codes.

7. Apparatus for testing a code division multiple access (CDMA) communications system receiver, the apparatus comprising a signal injection means configured to inject a constellation signal into the receiver at a predetermined carrier frequency, and a computer system, wherein the computer system is configured to:
    store a plurality of CDMA code patterns;
    compute a precomputed frequency spectrum from each of the code patterns in the plurality of CDMA code patterns, each precomputed frequency spectrum comprising a plurality of frequency bins;
    apply a predetermined phase shift to each frequency bin in each of the plurality of precomputed frequency spectrums, thereby generating a plurality of modified frequency spectrums wherein the predetermined phase shift represents a propagation delay in a given signal reaching the CDMA receiver after its emission from the respective CDMA transmitter;
    perform a vector sum of the modified frequency spectrums to generate a constellation frequency spectrum; and
    apply an inverse Fourier transform to the constellation frequency spectrum to generate the constellation signal.

8. A GPS receiver test kit comprising the apparatus of claim 7, wherein the CDMA code patterns are the GPS coarse acquisition codes.

9. A computer implemented method of generating a constellation signal for testing a CDMA receiver, the method comprising the following steps:
    receiving a plurality of CDMA code patterns; and
    generating a constellation signal from the plurality of CDMA code patterns, wherein generating the constellation signal comprises:
    computing a precomputed frequency spectrum from each of the code patterns in the plurality of CDMA code patterns, each precomputed frequency spectrum comprising a plurality of frequency bins;
    applying a predetermined phase shift to each of the frequency bins in each of the plurality of precomputed frequency spectrums, thereby generating a plurality of modified frequency spectrums, wherein the predetermined phase shift represents a propagation delay in a given signal reaching the CDMA receiver after its emission from the respective CDMA transmitter;
    performing a vector sum of the modified frequency spectrums to generate a constellation frequency spectrum; and
    applying an inverse Fourier transform to the constellation frequency spectrum to generate a constellation signal.

10. A system comprising:
    a processing device; and
    a non-transitory computer-readable medium communicatively coupled to the processing device, wherein the processing device is configured to execute program code stored in the non-transitory computer-readable medium and thereby perform the steps of the computer implemented method of claim 9.

11. A non-transitory computer readable storage medium having instructions stored therein, wherein the instructions are executable by a processor for performing the computer implemented method of claim 9.

* * * * *